(12) United States Patent
Mah et al.

(10) Patent No.: US 8,617,746 B2
(45) Date of Patent: *Dec. 31, 2013

(54) SI/C COMPOSITE, ANODE ACTIVE MATERIALS, AND LITHIUM BATTERY INCLUDING THE SAME

(75) Inventors: Sang-kook Mah, Seoul (KR); Han-su Kim, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,844

(22) Filed: Sep. 5, 2012

(65) Prior Publication Data

US 2012/0328943 A1 Dec. 27, 2012

Related U.S. Application Data

(63) Continuation of application No. 12/118,972, filed on May 12, 2008, now Pat. No. 8,263,265.

(30) Foreign Application Priority Data

Jul. 27, 2007 (KR) .................. 2007-75911

(51) Int. Cl.
- *H01M 4/80* (2006.01)
- *H01M 4/13* (2010.01)
- *H01M 4/60* (2006.01)
- *H01M 4/68* (2006.01)

(52) U.S. Cl.
USPC ...... 429/236; 429/213; 429/218.1; 429/231.8

(58) Field of Classification Search
USPC .................. 429/236, 213, 218.1, 231.8, 235; 428/446

See application file for complete search history.

(56) References Cited

U.S. PATENT DOCUMENTS

| | | | |
|---|---|---|---|
| 3,476,640 A * | 11/1969 | Seiter et al. .................. | 428/142 |
| 6,770,399 B2 | 8/2004 | Umeno et al. | |
| 7,648,932 B2 | 1/2010 | Weisensel et al. | |
| 8,263,265 B2 * | 9/2012 | Mah et al. .................... | 429/236 |
| 2002/0086211 A1 | 7/2002 | Umeno et al. | |
| 2004/0033419 A1 | 2/2004 | Funabiki | |
| 2005/0233213 A1 * | 10/2005 | Lee et al. .................... | 429/218.1 |
| 2006/0292452 A1 | 12/2006 | Utsugi et al. | |
| 2008/0027149 A1 * | 1/2008 | Aikyou et al. ................. | 516/32 |

FOREIGN PATENT DOCUMENTS

| | | |
|---|---|---|
| CN | 1 495 944 A | 5/2004 |
| JP | 10-003920 | 1/1998 |
| JP | 2002-216751 | 8/2002 |
| JP | 2004-055505 | 2/2004 |
| JP | 2004-327330 | 11/2004 |

(Continued)

OTHER PUBLICATIONS

Chinese Office Action in CN 200810128848.7, dated Mar. 1, 2012 (Mah, et al.).

(Continued)

*Primary Examiner* — Patrick Ryan
*Assistant Examiner* — Julian Anthony
(74) *Attorney, Agent, or Firm* — Lee & Morse, P.C.

(57) ABSTRACT

An Si/C composite includes carbon (C) dispersed in porous silicon (Si) particles. The Si/C composite may be used to form an anode active material to provide a lithium battery having a high capacity and excellent capacity retention.

17 Claims, 3 Drawing Sheets

(56) References Cited

FOREIGN PATENT DOCUMENTS

| | | |
|---|---|---|
| JP | 2006-294476 | 10/2006 |
| KR | 10-2004-0063802 A | 7/2004 |
| KR | 10-2004-0082876 A | 9/2004 |
| KR | 10-2004-0082876 A | 9/2004 |
| WO | WO-2005/057715 A1 | 6/2005 |

OTHER PUBLICATIONS

Chinese Office Action in CN 200810128848.7, dated Dec. 4, 2012 (Mah, et al.).

Japanese Office Action dated Apr. 2, 2013.

Y. Zhang, Composite anode material of silicon/graphite/carbon nanotubes for Li-ion batteries,Electrochimica Acta 51, 2006, pp. 4994-5000.

* cited by examiner

SI/C COMPOSITE, ANODE ACTIVE MATERIALS, AND LITHIUM BATTERY INCLUDING THE SAME

CROSS-REFERENCE TO RELATED APPLICATIONS

This is a continuation application based on application Ser. No. 12/118,972, filed May 12, 2008 now U.S. Pat. No. 8,263,265, the entire contents of which is hereby incorporated by reference.

This application claims the benefit of Korean Patent Application No. 10-2007-0075911, filed on Jul. 27, 2007, in the Korean Intellectual Property Office, the disclosure of which is incorporated herein in its entirety by reference.

BACKGROUND OF THE INVENTION

1. Field of the Invention

Aspects of the present invention relate to an Si/C composite, anode active materials, and a lithium battery including the same. More particularly, aspects of the present invention relates to an Si/C composite having a high charge/discharge capacity and a good capacity retention, anode active materials, and a lithium battery including the same.

2. Description of the Related Art

Various conventional techniques for using of lithium metals as anode materials for lithium batteries have been suggested. However, when lithium metals are used as anode materials, short circuits of a battery may occur due to lithium dendrite formation, which creates a high risk of explosion. Thus, to overcome such shortcoming, carbonaceous active materials have been widely used as anode materials instead of lithium metals. Examples of carbonaceous active materials include crystalline carbon, such as natural graphite and artificial graphite, and amorphous carbon, such as soft carbon and hard carbon. However, although amorphous carbon has good capacity, when used, many of the charge/discharge reactions are irreversible. Since the theoretical capacity of crystalline carbon (such as, for example, graphite) is relatively high, i.e., 372 mAh/g, crystalline carbon has been widely used as an anode active material. However, although the theoretical capacity of such graphite- or carbon-based active materials is currently considered to be rather high, the theoretical capacity is not high enough for future lithium batteries, which may require higher capacities.

To address these problems, research into metal-based anode active materials and intermetallic compound-based anode active materials has been actively conducted. For example, research into lithium batteries using metals or semimetals such as aluminum, germanium, silicon, tin, zinc, lead, etc., as the anode active materials has been conducted. Such materials are known to have large capacities, high energy densities, and good insertion/extraction capabilities compared to carbon-based anode active materials. Thus, lithium batteries having large capacities and high energy densities can be prepared using these materials. For example, pure silicon is known to have a high theoretical capacity of 4017 mAh/g.

However, such materials typically have shorter life cycles than carbon-based materials, and thus are difficult to put to practical use. When inorganic particles such as silicon or tin are used as the anode active material, the volume of the inorganic particles changes considerably during charge/discharge cycles. This may result in the degradation of the electronic conduction network between the active material particles or may result in the detachment of the anode active material from the anode current collector. That is, the volume of inorganic material such as silicon or tin increases by about 300 to 400% due to alloying with lithium during charging, and the volume decreases due to extraction of lithium during discharging. Therefore, after repeated charge/discharge cycles, spaces may be generated between the active material particles, and electrical insulation may occur, thereby rapidly lowering the capacity retention of these materials, thereby causing a serious problem when these materials are used in lithium batteries.

To overcome these disadvantages, research into methods of absorbing the volume expansion of metal particles by using nano-sized silicon particles or porous silicon has been carried out. With regard to the nano-sized silicon particles, Japanese Laid-Open Patent Application Publication No. 1998-003920 discloses a lithium secondary battery having metallic nanoparticles coated with carbon. However, the nanoparticles are quite expensive to produce, the carbon (which is brittle) on the surface of the nanoparticles cracks due to expansion during charging, and spaces are generated between carbon and metal nanoparticles due to contraction during discharging. Therefore, improvements in battery life cycle are restricted. With regard to porous silicon, several methods have been disclosed. For example, Japanese Laid-Open Patent Application Publication No. 2004-327330 discloses the use of cathodic oxidation. Korean Patent Publication No. 2004-0063802 discloses a preparation method of a negative active material in which an alloy is formed of Si and an elemental metal such as Ni, and the elemental metal is then eluted. Also, Korean Patent Publication No. 2004-0082876 discloses a preparation method of porous silicon comprises mixing an alkali metal or alkali earth metal powder with a silicon precursor powder such as silicon dioxide, and heating the mixture under inert atmosphere, followed by eluting with acid. Although these methods demonstrate an improvement in the initial capacity retention to some extent owing to the absorbing effects of the volume expansion derived from porous structures, the use of only porous silicon particles with low conductivity may lower the electric conductivity among particles in the course of manufacturing an electrode plates unless nanoparticles are used, ultimately deteriorating the initial coulombic efficiency or the capacity retention. However, according to these methods, it is not possible to prepare nanoparticles, or additional processing costs may be involved.

Accordingly, there is a need for an anode active material with high initial coulombic efficiency and good capacity retention using a material that can improve the conductivity of particles.

SUMMARY OF THE INVENTION

Aspects of the present invention provide an Si/C composite for an anode active material with high initial coulombic efficiency and good capacity retention.

Aspects of the present invention also provide a method for preparing the Si/C composite.

Aspects of the present invention also provide an anode active material including the Si/C composite.

Aspects of the present invention also provide a lithium battery comprising the anode active material.

According to an embodiment of the present invention, there is provided an Si/C composite having carbon (C) dispersed in porous silicon (Si) particles.

According to an aspect of the present invention, the amount of the carbon ranges from about 1 to about 70% by weight relative to the total weight of the composite.

According to another aspect of the present invention, the carbon is crystalline carbon or amorphous carbon.

According to another aspect of the present invention, the porous silicon particles have a diameter in a range from about 0.01 to about 100 μm.

According to another aspect of the present invention, the Si/C composite may further comprise carbon on the outer shell of the porous silicon particles.

According to another aspect of the present invention, the Si/C composite may further comprise silicon carbide (SiC).

According to another embodiment of the present invention, there is provided a method for preparing an Si/C composite including mixing an alkali metal or an alkali earth metal with a silica/C composite and subjecting to heat treatment under inert atmosphere to reduce the silica, and treating a resultant product of the heat treatment with acid to remove impurities.

According to another aspect of the present invention, the silica/C composite may be obtained by mixing silicon oxide and carbon (C).

According to another aspect of the present invention, the silica/C composite may be obtained by mixing silicon oxide and a carbon precursor, a silicon oxide precursor and carbon, or a silicon oxide precursor and a carbon precursor, and performing pre-heat treatment on the resultant mixture under inert atmosphere.

According to another aspect of the present invention, the silicon oxide may be at least one selected from the group consisting of SiO, $SiO_2$, silica gel, glass, quartz and zeolite.

According to another aspect of the present invention, the carbon may be at least one selected from the group consisting of natural graphite, artificial graphite, carbon particles, and carbon nanotubes.

According to another aspect of the present invention, the precursor of the silicon oxide may be silicon alkoxide or silicon halide.

According to another aspect of the present invention, the precursor of the carbon may be pitch or a hydrocarbon-based material.

According to another aspect of the present invention, the method may further include coating the product of the heat treatment with carbon.

According to another aspect of the present invention, the alkali metal may be lithium (Li), sodium (Na), potassium (K), rubidium (Rb), cesium (Cs), or francium (Fr).

According to another aspect of the present invention, the alkaline earth metal may be beryllium (Be), magnesium (Mg), calcium (Ca), strontium (Sr), barium (Ba), or radium (Ra).

According to another aspect of the present invention, the heat treatment or the pre-heat treatment may be performed at a temperature in a range of between about 350 and 1400° C. for 1 minute to 100 hours.

According to another embodiment of the present invention, there is provided an anode active material having the Si/C composite.

According to another aspect of the present invention, the anode active material may further comprise carbon on an outer shell of the porous silicon particles.

According to another aspect of the present invention, the anode active material may further comprise a material that can be alloyed with lithium.

According to another aspect of the present invention, the material that can be alloyed with lithium may be at least one selected from the group consisting of Si, $SiO_x$, Sn, $SnO_x$, Ge, $GeO_x$, Pb, $PbO_x$, Ag, Mg, Zn, $ZnO_x$, Ga, In, Sb and Bi.

According to another embodiment of the present invention, there is provided an anode comprising the anode active material having the Si/C composite and a metal current collector.

According to another embodiment of the present invention, there is provided a lithium battery including a cathode, an anode and an electrolyte solution, the anode comprising a metal current collector and an anode active material coated on the metal current collector.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
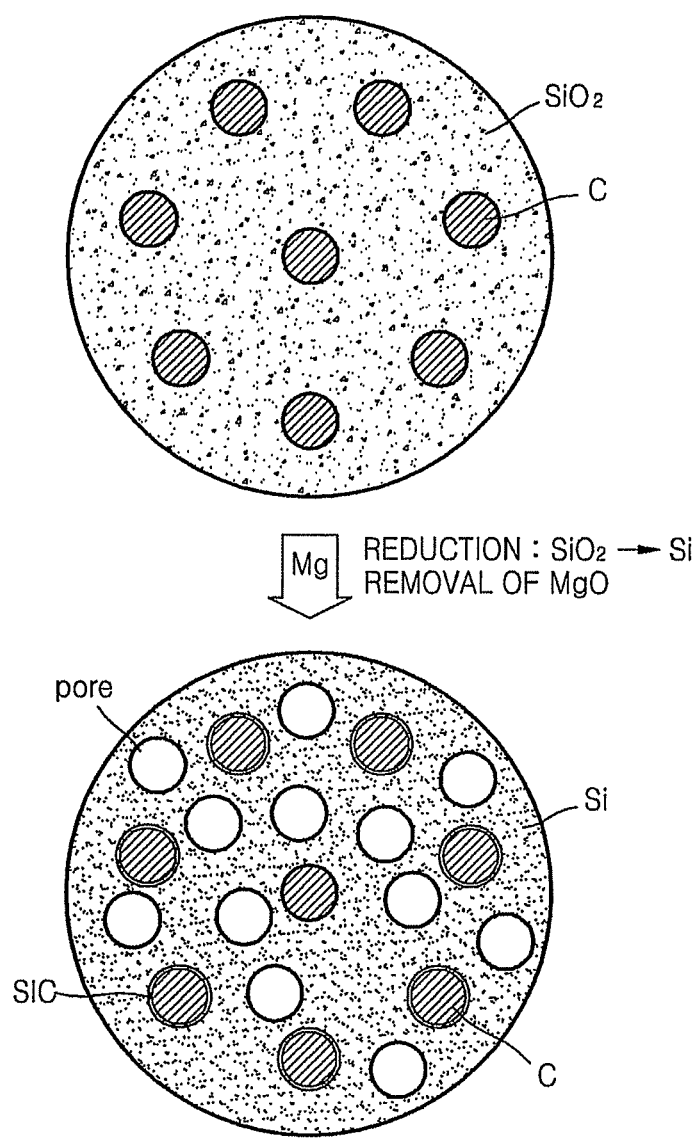
FIG. 1 is a schematic view depicting an Si/C composite and a method of making the Si/C composite according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a porous Si/C composite prepared by reducing a silica/C composite using an alkali metal or an alkaline earth metal.

Silicon oxide or its precursor and carbon (C) or its precursor are used to effectively disperse carbon in silicon particles compared to general mixing method. The porous silicon and well dispersed carbon play a role as an anode active material in order to prevent deterioration of capacity retention due to expansion and shrinkage during charge-discharge cycles in the porous Si/C composite.

Aspects of the present invention also provide anode active materials obtained by mixing or coating particles of the porous Si/C composite and carbon, or particles that can be alloyed with lithium. Furthermore, aspects of the present invention provide a lithium battery using the anode active material.

If a composite is composed of only porous silicon particles, the porosities of the composite have an absorbing effect, thereby improving the initial capacity retention. However, if the composite includes only porous silicon particles with low conductivity, which may lower the electric conductivity among particles in the course of manufacturing electrode plates, the initial coulombic efficiency or the capacity retention may be worsened. In contrast, since the Si/C composite according to aspects of the present invention contains carbon, which has excellent conductivity, in porous silicon particles, the conductivity among particles can be improved.

In the Si/C composite according to aspects of the present invention, the carbon may be crystalline carbon or amorphous carbon in a dispersed state in porous silicon particles. The terms "dispersed" and "dispersed state" are used herein with respect to the crystalline or amorphous carbon to indicate that the carbon is embedded into the porous silicon particles or that the carbon is coated with the porous silicon, as opposed to being simply combined to yield an agglomerated product or a mixture.

In the Si/C composite according to aspects of the present invention, the carbon is contained in an amount of 1 to 70 wt % based on the total weight of the Si/C composite. If the amount of the carbon is less than 1 wt %, the conductivity improving effect of the Si/C composite may be negligible. If the amount of the carbon exceeds 70 wt %, the effect exerted by adding the porous silicon particles cannot be achieved.

The carbon dispersed in the Si/C composite according to aspects of the present invention may be either crystalline carbon or amorphous carbon. Examples of the carbon include natural graphite, artificial graphite, carbon particles, and carbon nanotubes.

As the carbon, natural graphite, artificial graphite, carbon particles, or carbon nanotubes may be used without further treatment. Alternatively, a carbon precursor such as a pitch or a hydrocarbon-based material may be subjected to heat treatment to be converted into carbon (C).

The porous silicon particles having the carbon dispersed therein are obtained by reducing silica using an alkali metal or an alkaline earth metal and by eluting impurities with acid, thereby providing the anode active material with a high degree of porosity. The porosity provides buffering in the volume expansion and shrinkage due to intercalation/deintercalation of lithium. As non-limiting examples, the porous silicon particles may have a diameter ranging from 0.01 to 100 μm. If the diameter is less than 0.01 μm, it may be difficult to maintain a predetermined extent of porosity. If the diameter is greater than 100 μm, formability of an electrode may be undesirably poor. The extent of porosity of the porous silicon particles is not particularly limited and may range from 1 to 80% or from 20 to 60%.

The Si/C composite according to aspects of the present invention may produce a small amount of SiC at an interface between Si and C during the heat treatment of the silica/C composites.

In addition, the Si/C composite according to aspects of the present invention having the carbon embedded therein may further have carbon coated thereon, thereby improving the conductivity among the porous silicon particles.

The Si/C composite according to aspects of the present invention can be prepared in the following manner.

An alkali metal or an alkali earth metal is mixed with a silica/C composite and subjected to heat treatment under inert atmosphere to reduce the silica, thereby obtaining an Si/C composite. Then, the Si/C composite is treated with acid to remove impurities.

The silica/C composite may be obtained by mixing silicon oxide and a carbon precursor, a silicon oxide precursor and carbon, or a silicon oxide precursor and a carbon precursor, and performing a pre-heat treatment on the resultant mixture under inert atmosphere. As used herein, the term "pre-heat treatment" refers to a heat treatment that is performed on a mixture of a silicon oxide and a carbon precursor, a mixture of a silicon oxide precursor and carbon or a mixture of a silicon oxide precursor and a carbon precursor before the heat treatment that forms the Si/C composite.

In the preparation process, usable examples of the silicon oxide include SiO, $SiO_2$, silica gel, glass, quartz and zeolite. The precursor of the silicon oxide is not particularly restricted and can be any material capable of forming silica through heat treatment, such as, for example, a silicate prepared from silicon alkoxide or silicon halide.

In the preparation process, the carbon may be at least one selected from the group consisting of natural graphite, artificial graphite, carbon particles, and carbon nanotubes. The precursor of the carbon is not particularly restricted and can be any material capable of forming carbon through heat treatment, such as, for example, pitch, or a hydrocarbon-based material. Examples of the hydrocarbon-based material include furfural alcohol, or a phenol-based resin.

The pre-heat treatment may be performed by mixing silicon oxide and a carbon precursor, a silicon oxide precursor and carbon, or a silicon oxide precursor and a carbon precursor in a solvent, e.g., alcohol or tetrahydrofuran (THF), and performing the pre-heat treatment on the resultant mixture under inert atmosphere, e.g., under a flow of nitrogen gas or under a flow of argon gas. During the pre-heat treatment, the silicon oxide precursor is converted into silica ($SiO_2$) and the carbon precursor is converted into carbon. As a non-limiting example, the pre-heat treatment may be performed at a temperature in a range of between about 350 and 1400° C. for 1 minute to 100 hours. If the conditions of the pre-heat treatment are not met, a sufficient performance of converting into silica or carbon may not be achieved.

The pre-heat treatment of the mixture of silicon oxide and a carbon precursor, a silicon oxide precursor and carbon, or a silicon oxide precursor and a carbon precursor, or simply mixing silicon oxide and carbon, may provide a blended powder having silica and carbon mixed well, i.e., a silica/C composite. In order to convert the silica into silicon through a reduction reaction and to impart porosity to the anode active material, an alkali metal or an alkali earth metal used as a reducing agent is mixed with the silica/C composite and then subjected to heat treatment under inert atmosphere. The inert atmosphere may be created with a flow of nitrogen or argon gas, which is the same as described above in the pre-heat treatment. As a non-limiting example, the heat treatment may be performed at a temperature in a range of between about 350 and 1400° C. for 1 minute to 100 hours. If the conditions of the heat treatment are not met, silica may not be sufficiently reduced, or a heat-treatment temperature or time exceeding the listed range may not be cost-effective.

In the reduction reaction, an alkali metal such as lithium (Li), sodium (Na), potassium (K), rubidium (Rb), cesium (Cs), or francium (Fr) can be used as a reducing agent. In addition or alternatively, an alkaline earth metal such as beryllium (Be), magnesium (Mg), calcium (Ca), strontium (Sr), barium (Ba), and radium (Ra) can also be used. The resultant product of the heat treatment and the reduction reaction is eluted using acid, thereby removing an oxide of the reducing agent and residues. The acid used in the eluting step may be an aqueous acid solution such as a hydrochloric acid solution, a hydrosulfuric acid solution, or a hydronitric acid solution.

FIG. 1 illustrates a process of converting the silica into the porous silicon particles in the presence of a reducing agent. As illustrated in FIG. 1, the silica/C composite exists as a porous Si/C composite. The silica is reduced by magnesium (Mg) used as a reducing agent and MgO is removed by acid treatment.

The acid-treated Si/C composite produced as described above can be used as an anode active material. However, in order to further increase the conductivity of the material, the Si/C composite may further be coated with carbon. The coating with carbon is performed by dissolving a carbon precursor in a solvent, e.g., THF, or alcohol, and adding the solution to the composite, followed by drying and performing a heat treatment.

Alternatively, the Si/C composite can be used in combination with carbon and/or a material that can be alloyed with lithium. The material that can be alloyed with lithium may be at least one selected from the group consisting of Si, $SiO_x$, Sn, $SnO_x$, Ge, $GeO_x$, Pb, $PbO_x$, Ag, Mg, Zn, $ZnO_x$, Ga, In, Sb and Bi.

The anode active material prepared in the above-described manner can be advantageously used for a lithium battery according to aspects of the present invention. The lithium battery according to aspects of the present invention is prepared as follows.

First, a cathode active material, a conducting agent, a binder, and a solvent are mixed to prepare a cathode active material composition. The cathode active material composition is directly coated onto an aluminum current collector and dried to prepare a cathode electrode. In an alternative embodiment, the cathode active material composition is cast on a separate support body, and peeled off to obtain a cathode active material film, and then the cathode active material film is laminated on the aluminium current collector.

A lithium-containing metal oxide may be used as the cathode electrode active material. Non-limiting examples of the lithium-containing metal oxide include, but are not limited to, $LiCoO_2$, $LiMn_xO_{2x}$, $LiNi_{1-x}Mn_xO_{2x}$ (x=1, 2), and $Ni_{1-x-y}Co_xMn_yO_2$ ($0 \leq x \leq 0.5$, $0 \leq y \leq 0.5$).

Carbon black may be used as the conducting agent. Usable examples of the binder include a vinylidene fluoride/hexafluoropropylene (HFP) copolymer, polyvinylidene difluoride (PVdF), polyacrylonitrile, polymethacrylate, polytetrafluoroethylene, mixtures of these materials, and a styrene butadiene rubber polymer. As the solvent, N-methyl-pyrrolidone, acetone, water, or the like, may be used. The cathode electrode active material, the conducting agent, the binder, and the solvent may be used in the manufacture of the lithium battery in amounts that are generally acceptable in the art.

As in the preparation of the cathode plate, the anode active material according to aspects of the present invention is prepared by mixing a conducting agent, a binder, and a solvent to form an anode active material composition. The anode active material composition is directly coated onto a copper current collector and dried to form an anode plate. Alternatively, the anode plate may be manufactured by laminating a copper current collector with an anode active material film that is previously formed by casting the anode active material composition on a support and then separated therefrom. Here, the anode active material, the conducting agent, the binder and the solvent are used in amounts commonly used in lithium batteries.

Examples of the anode active material include the Si/C composite according to the present invention, and the like. The same conducting agent, binder and solvent as those used in the cathode active material composition may be used in the anode active material composition. In one embodiment of the present invention, a plasticizing agent may be further added into each of the cathode and anode active material compositions to form porous cathode and anode plates.

Any separator that is commonly used for lithium batteries can be used in the current embodiment. In particular, the separator that is used may have low resistance to the migration of ions in an electrolyte and have an excellent electrolyte-retaining ability. Specific examples of the separator are glass fiber, polyester, polyethylene, polypropylene, polytetrafluoroethylene (PTFE), a combination thereof, and a material which can be rolled and which may be in non-woven or woven fabric form. In particular, a separator comprising, but not limited to, polyethylene, polypropylene or the like can be used for a lithium ion battery. A separator that can retain a large amount of an organic electrolytic solution may be used for a lithium-ion polymer battery. A method of forming these separators will now be described.

A polymer resin, a filler, and a solvent are mixed to prepare a separator composition. The separator composition is directly coated on the electrode, and then dried to form a separator film. Alternately, the separator composition can be cast onto a separate support, dried, detached from the separate support, and finally laminated on an upper portion of the electrode, thereby forming a separator film.

Any polymer resin that is commonly used for lithium batteries can be used in the current embodiment. Examples of the polymer resin include, but are not limited to, vinylidenefluoride/hexafluoropropylene copolymer, polyvinylidenefluoride, polyacrylonitrile, polymethylmethacrylate and a mixture thereof. As a non-limiting example, a vinylidenefluoride/hexafluoropropylene copolymer containing 8 to 25% by weight of hexafluoropropylene may be used.

The separator is disposed between the cathode plate and the anode plate manufactured as described above to form an electrode assembly. This electrode assembly is wound or folded and then sealed in a cylindrical or rectangular battery case. Next, the organic electrolytic solution according to aspects of the present invention is injected into the battery case so that a complete lithium secondary battery is obtained.

Alternatively, the electrode assembly may be stacked to form a bi-cell structure, which is then impregnated with an organic electrolyte solution and the resulting structure is sealed in a pouch, thereby completing a lithium ion polymer battery.

The organic electrolyte solution for the lithium battery includes a lithium salt, and a mixed organic solvent consisting of a high dielectric constant solvent and a low boiling point solvent.

Any high dielectric constant solvent commonly used in the art may be used without limitation according to aspects of the present invention, and specific examples thereof include cyclic carbonates such as ethylene carbonate, propylene carbonate, or butylene carbonate, and γ-butyrolactone. If desired, a variety of additives, such as an overcharge preventing agent, may further be added.

Further, the low boiling point solvent may be any low boiling point solvent commonly used in the art. Non-limiting examples thereof include chain carbonates such as dimethyl carbonate, ethyl methyl carbonate, diethyl carbonate, or dipropyl carbonate, dimethoxyethane, diethoxyethane, fatty acid ester derivatives, and the like.

The high dielectric constant solvent and the low boiling point solvent may be substituted with at least one halogen atoms such as, for example, fluorine, in place of one or more hydrogen atoms.

As a non-limiting example, the high dielectric constant solvent and the low boiling point solvent may be preferably mixed in a ratio of 1:1 to 1:9 by volume. If the volumetric ratio of the low boiling point solvent to the high dielectric constant solvent does not fall within the stated range, the lithium battery may demonstrate undesirable characteristics in terms of discharge capacity, charge/discharge cycles and lifespan.

In addition, the lithium salt is not particularly limited, and may be a lithium salt that is generally used for a lithium battery. As non-limiting examples, the lithium salt may be at least one selected from the group consisting of $LiClO_4$, $LiCF_3SO_2$, $LiPF_6$, $LiN(CF_3SO_2)_2$, $LiBF_4$, $LiC(CF_3SO_2)_3$, and $LiN(C_2F_6SO_2)_2$.

As a non-limiting example, the concentration of the lithium salt may be in the range of 0.5 to 2.0 M. If the concentration of the lithium salt is less than 0.5 M, the ionic conductivity of the electrolytic solution decreases, so that the performance of the electrolytic solution may be degraded. If the concentration of the lithium salt is greater than 2.0 M, the viscosity of the electrolytic solution increases, so that mobility of lithium ions may be undesirably reduced.

Aspects of the present inventive will be described in greater detail with reference to the following examples. The following examples are for illustrative purposes only and are not intended to limit the scope of the general inventive concept.

Example 1

0.12 g of conductive carbon particles treated with acid (Super-P, TimCal Co.), 5 g of ethanol, and 8.07 g of tetraethyl ortho silicate (TEOS) were added with stirring to a 50 ml vial, and 2.8 g of a 1M aqueous hydrochloric acid solution was slowly added to the resulting mixture. The resulting mixture was subjected to ultrasonic treatment for 1 hour, followed by reacting the mixture in a bath maintained at 60° C. until the mixture was gelled. The gelled resultant product was further dried in an oven maintained at 80° C., obtaining an $SiO_2/C$ composite. 0.1 g of the obtained $SiO_2/C$ composite and 0.085 g of magnesium particles were heat-treated under a flow of argon gas at 900° C. The resultant product was stirred in 0.1 M aqueous hydrochloric acid for 24 hours, filtered using a filter paper, and dried in an oven maintained at 80° C., thereby preparing an active material.

Example 2

0.2 g of the active material prepared in Example 1, 5 wt % of a pitch and 1.6 g of tetrahydrofuran (THF) were mixed, and dried at 60° C. with stirring to evaporate the THF. The dried product was subjected to heat treatment under a flow of argon at 900° C., thereby preparing an anode active material.

Comparative Example 1

An aqueous solution obtained from 4 g of a surfactant (P123, Pluronic) dissolved in 30 g of water and 120 g of a 2M hydrochloric solution were mixed at 35° C., 8.5 g of TEOS was slowly added thereto, and 2 g of 1,3,5-trimethylbenzene (TMB) was added to the mixture. The resultant product was reacted at 35° C. for 20 hours, and the mixture was allowed to stand undisturbed at 80° C. overnight without stirring. The undisturbed mixture was filtered, dried at room temperature, and subjected to heat treatment at 500° C., thereby producing mesoporous silica particles. 0.1 g of the mesoporous silica particles and 0.09 g of Mg particles were subjected to heat treatment at 900° C. under a flow of argon gas. The resultant product was stirred in a 0.1M hydrochloric acid solution for 24 hours, filtered using a filter paper, and dried in an oven maintained at 80° C., preparing an anode active material.

Comparative Example 2

Si particles having a diameter of approximately 43 μm were crushed by ball milling, thereby obtaining Si particles having an average particle diameter of approximately 1 μm. 0.03 g of the obtained Si particles and 0.06 g of graphite (SFG6, TimCal) were mixed, thereby preparing an active composite material.

Comparative Example 3

0.03 g of the active material prepared in Comparative Example 1 and 0.06 g of graphite (SFG6, TimCal) were mixed, thereby preparing an active material composite.

Examples 3 and 4

0.03 g of each of the anode active materials prepared in Examples 1 and 2, and 0.06 g of graphite (SFG6, TimCal) were mixed, thereby preparing active material composites.

Experimental Example

Cycling Test

The active material composites obtained in Examples 3 and 4 and Comparative Examples 2 and 3, and 0.2 g of a solution of 5 wt % polyvinylidene fluoride (PVDF, Kureha Chemical Industry Corporation, Japan) in N-methylpyrrolidone (NMP) were mixed to prepare slurries, and the slurries were coated on a copper foil to prepare electrodes.

The electrodes were used as anodes, and Li was used as cathodes to prepare 2016-type coin cells. Charge/discharge cycle tests were performed between 1.5 and 0 V on each of the cells.

The electrolyte consisted of a solution of 1.3 M $LiPF_6$ in ethylene carbonate (EC)/diethylene carbonate (DEC)/fluoro ethylene carbonate (FEC) (2:6:2 volume ratio).

Each of the cells was charged until the voltage of a Li electrode reached 0.001 V with a constant current of 100 mA per 1 g of active material. After a 10-minute rest time, the charged cell was discharged until the voltage reached 1.5 V with a constant current of 100 mA per 1 g of active material. Cycling was repeatedly performed and the coulombic efficiency, discharge capacity and capacity retention were determined. The experimental results thereof are shown in Table 1 and FIGS. 4 and 5.

Figure 2:
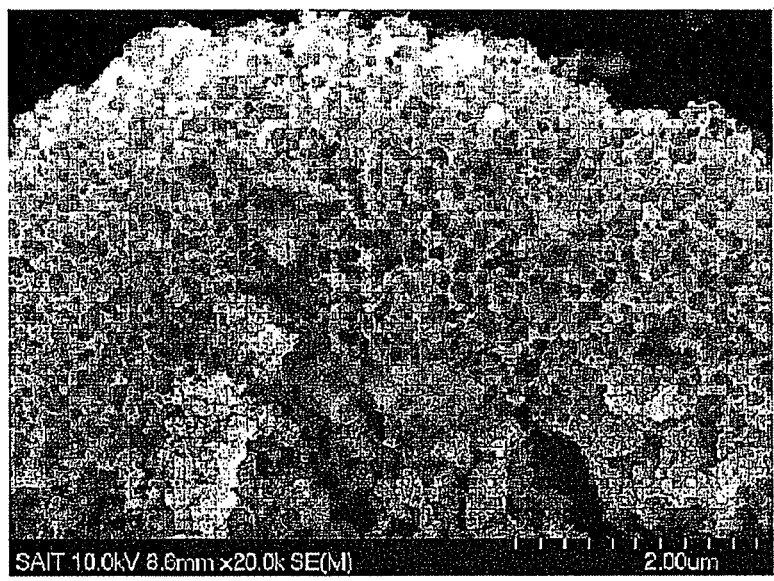
FIG. 2 is a scanning electron microscope (SEM) image of an Si/C composite prepared according to Example 1.
Figure 3:
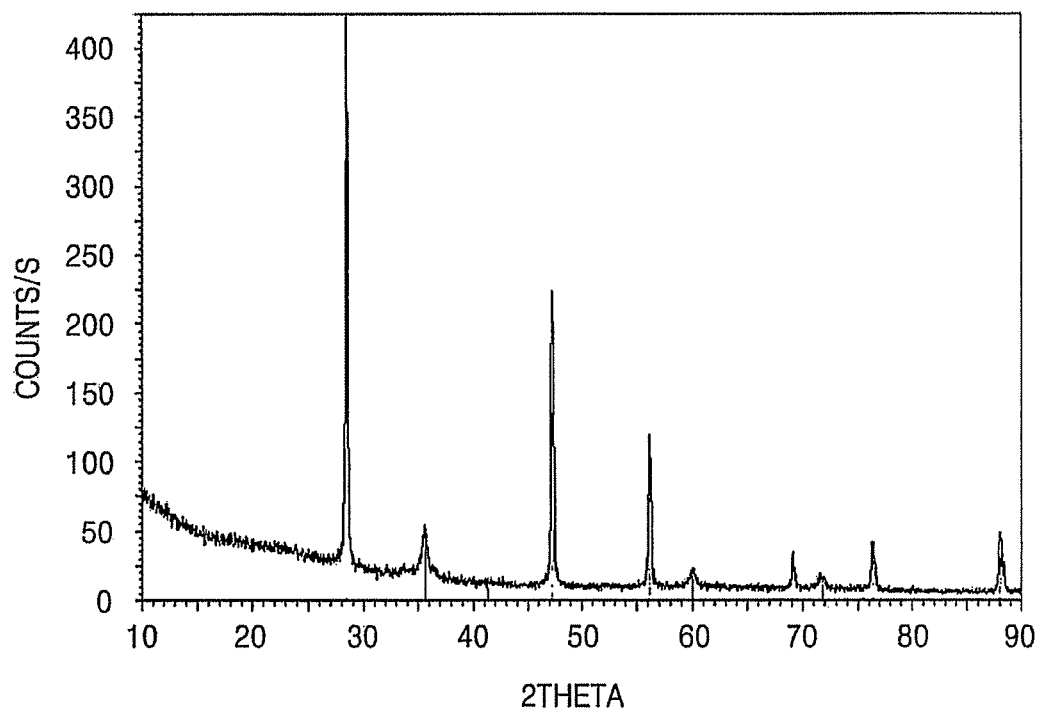
FIG. 3 shows XRD results of the Si/C composite prepared according to Example 1.

FIG. 2 is a scanning electron microscope (SEM) image of the Si/C composite prepared according to Example 1. As shown in FIG. 2, pores having a diameter in a range of 200 to 300 nm are present in the Si/C composite. FIG. 3 shows XRD results of the Si/C composite prepared according to Example 1. As confirmed from FIG. 3, silicon particles are smoothly formed through the reduction reaction, although several SiC peaks are observed.

Figure 4:
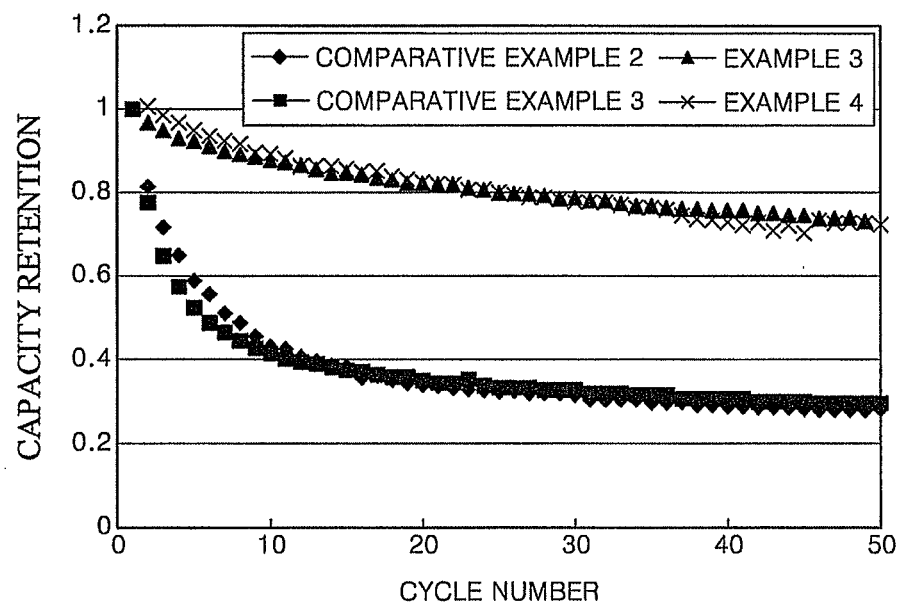
FIG. 4 is a graph showing the cycle dependency of capacity retention of anode active materials of Examples 3 and 4 and Comparative Examples 2 and 3 according to experimental results.
Figure 5:
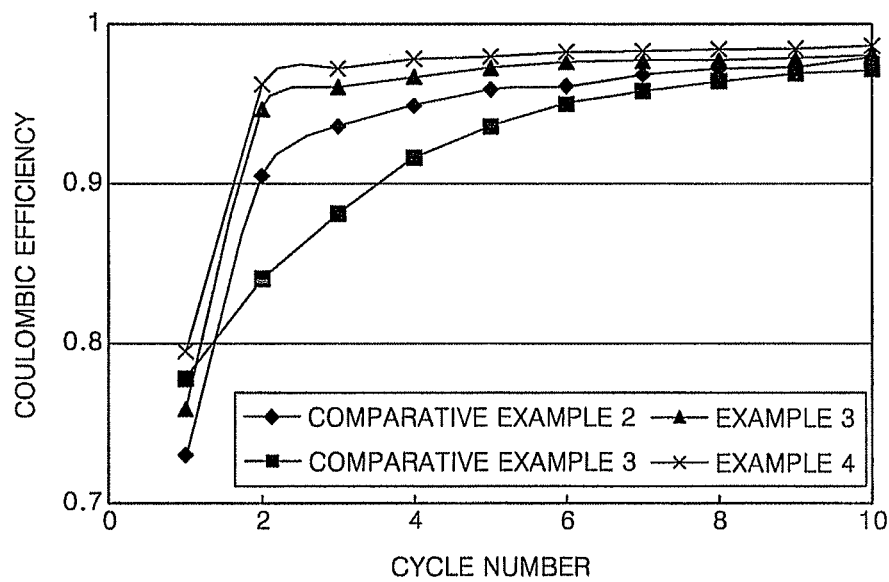
FIG. 5 is a graph showing the life cycle dependency of coulombic efficiency of anode active materials of Examples 3 and 4 and Comparative Examples 2 and 3 according to experimental results.

Table 1 and FIG. 4 show results of charge-discharge cycle tests. Since the active materials evaluated were used in the same amount in the Examples using a relatively small amount of Si, each of the cells using active materials prepared in the Examples has a somewhat lower $1^{st}$ discharge capacity but an improved initial coulombic efficiency and capacity retention compared to the active material of the Comparative Examples. Referring to FIG. 5, the lithium batteries using the active material composites prepared in Examples 3 and 4 have coulombic efficiency increasing rates much higher than those in Comparative Examples 2 and 3, which is presumably because the Si/C composite has higher conductivity than Si.

TABLE 1

|  | 1st Discharge Capacity (mAh/g) | 1st coulombic efficiency | 50th Discharge Capacity (mAh/g) | Capacity Retention (@50th Cycle) |
| --- | --- | --- | --- | --- |
| Comparative Example 2 | 963 | 0.73 | 273 | 25% |
| Comparative Example 3 | 989 | 0.78 | 290 | 29% |
| Comparative Example 4 | 800 | 0.33 | — | — |
| Example 3 | 855 | 0.76 | 625 | 73% |
| Example 4 | 847 | 0.80 | 657 | 78% |

In Table 1, Comparative Example 4 corresponds to Example 8 described in Korean Patent Application Publication No. 2004-0082876.

The anode active material according to aspects of the present invention has improved initial coulombic efficiency and capacity retention when the anode active material is included therein, compared to the conventional anode active material.

While aspects of the present invention have been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An anode active material comprising an Si/C composite, the Si/C composite including silicon (Si) particles having pores, and carbon embedded within the pores of Si particles and/or coated with the Si particles.

2. The anode active material of claim 1, wherein the Si/C composite further comprises carbon on the outer shell of the silicon particles.

3. The anode active material of claim 1, further comprising a material that is alloyable with lithium.

4. The anode active material of claim 3, wherein the material that is alloyable with lithium is at least one selected from the group of Si, $SiO_x$, Sn, $SnO_x$, Ge, $GeO_x$, Pb, $PbO_x$, Ag, Mg, Zn, $ZnO_x$, Ga, In, Sb and Bi.

5. The anode active material of claim 1, wherein a porosity of the Si particles ranges from about 1 to about 80%.

6. The anode active material of claim 1, wherein the Si particles include pores having a pore size in a range of from about 200 to about 300 nm.

7. The anode active material of claim 1, wherein an amount of carbon in the Si/C composite ranges from about 1 to about 70% by weight relative to the total weight of the Si/C composite.

8. The anode active material of claim 1, wherein the silicon particles have a diameter in a range of from about 0.01 to about 100 µm.

9. The anode active material of claim 1, further comprising carbon on an outer shell of the Si/C composite.

10. The anode active material of claim 1, wherein:
the Si/C composite includes carbon embedded within the pores of the silicon particles, and
silicon carbide (SiC) is present at an outer surface of the carbon embedded within the pores of the silicon particles.

11. A lithium battery comprising:
a cathode;
an anode including a metal current collector and an anode active material, the anode active material including an Si/C composite, the Si/C composite including silicon (Si) particles having pores, and carbon embedded within the pores of Si particles and/or coated with the Si particles; and
an electrolyte solution.

12. The lithium battery of claim 11, wherein the Si particles have a porosity ranging from about 1 to about 80%.

13. The lithium battery of claim 11, wherein the Si particles include pores having a pore size in a range from about 200 to about 300 nm.

14. The lithium battery of claim 11, wherein an amount of carbon in the Si/C composite ranges from about 1 to about 70% by weight relative to the total weight of the Si/C composite.

15. The lithium battery of claim 11, wherein the silicon particles have a diameter in a range from about 0.01 to about 100 µm.

16. The lithium battery of claim 11, further comprising carbon on an outer shell of the Si/C composite.

17. The lithium battery of claim 11, wherein:
the Si/C composite includes carbon embedded within the pores of the silicon particles, and
silicon carbide (SiC) is present at an outer surface of the carbon embedded within the pores of the silicon particles.

* * * * *